Figure 1:
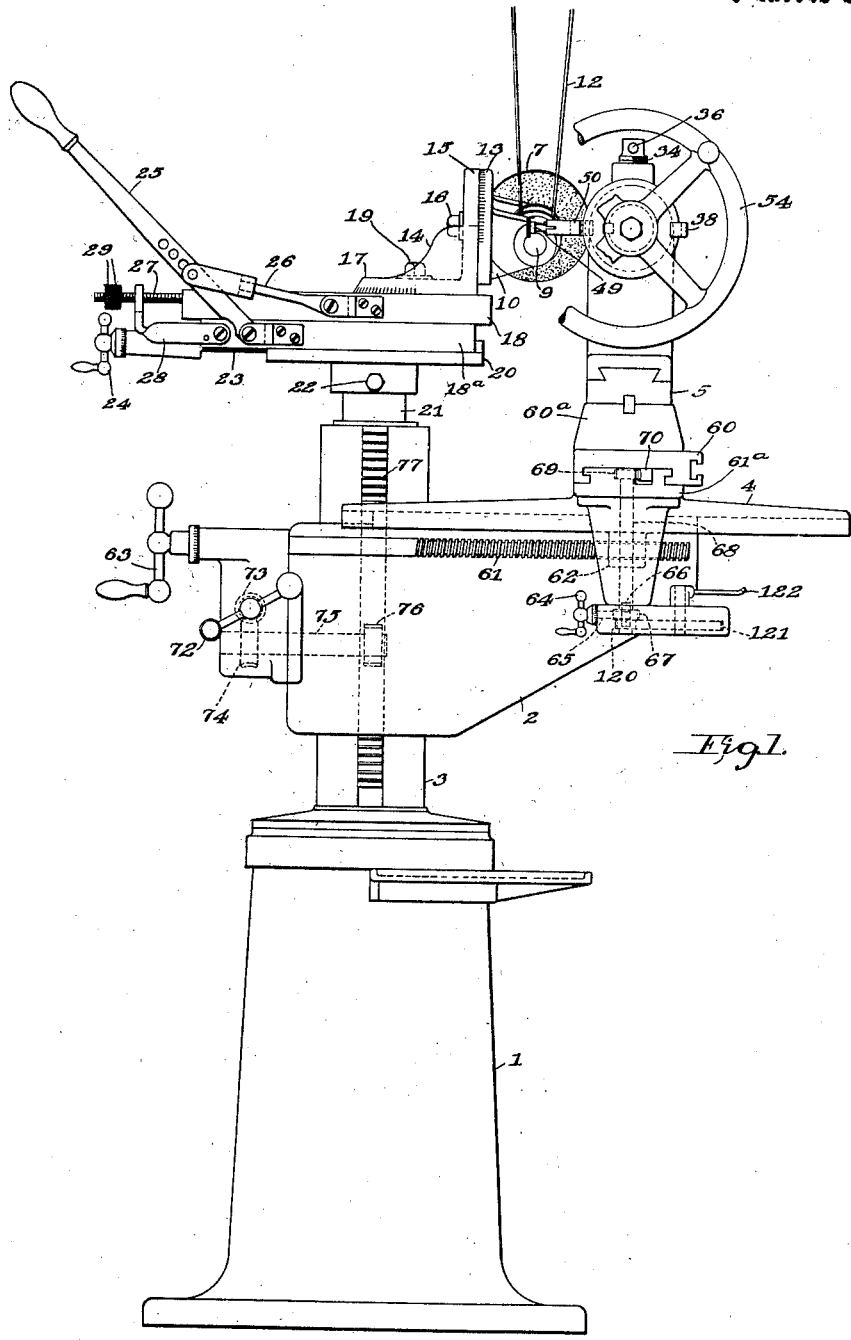

March 13, 1928.  
O. SEVERSON  
1,662,078  
METHOD OF AND MACHINE FOR GRINDING FINE TOOTH HOBS  
Filed Jan. 12, 1925  
5 Sheets-Sheet 1

Inventor  
Ole Severson  
By Attorney  
Albert F. Nathan

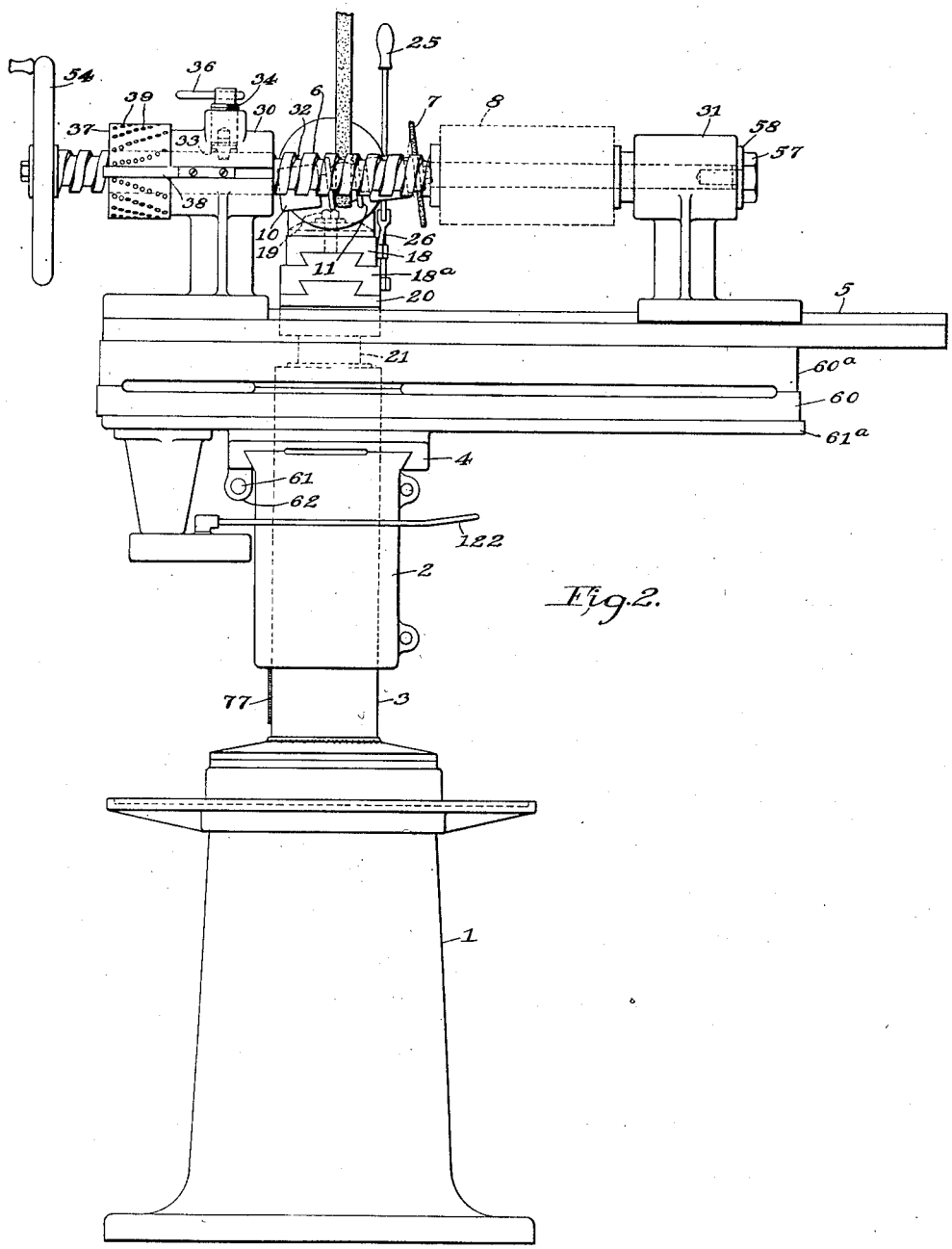

March 13, 1928.
O. SEVERSON
1,662,078
METHOD OF AND MACHINE FOR GRINDING FINE TOOTH HOBS
Filed Jan. 12, 1925  5 Sheets-Sheet 3
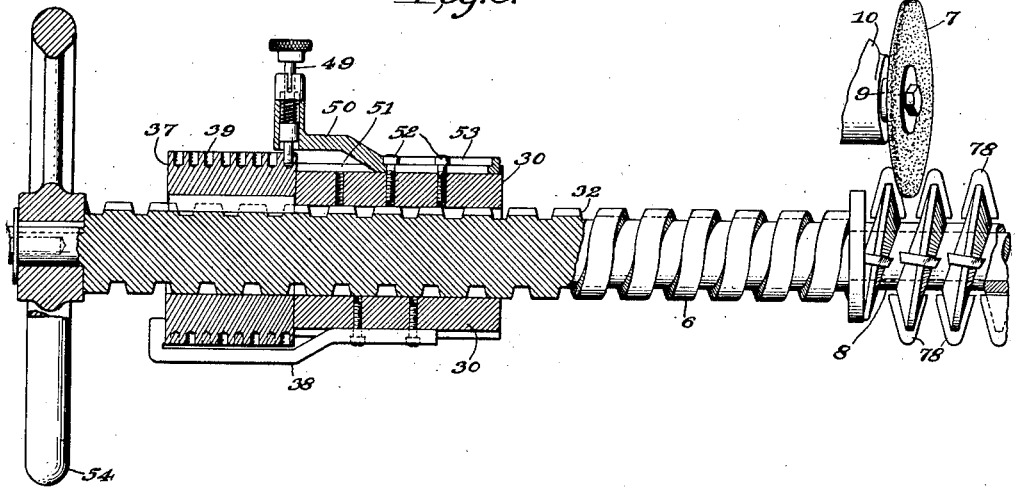
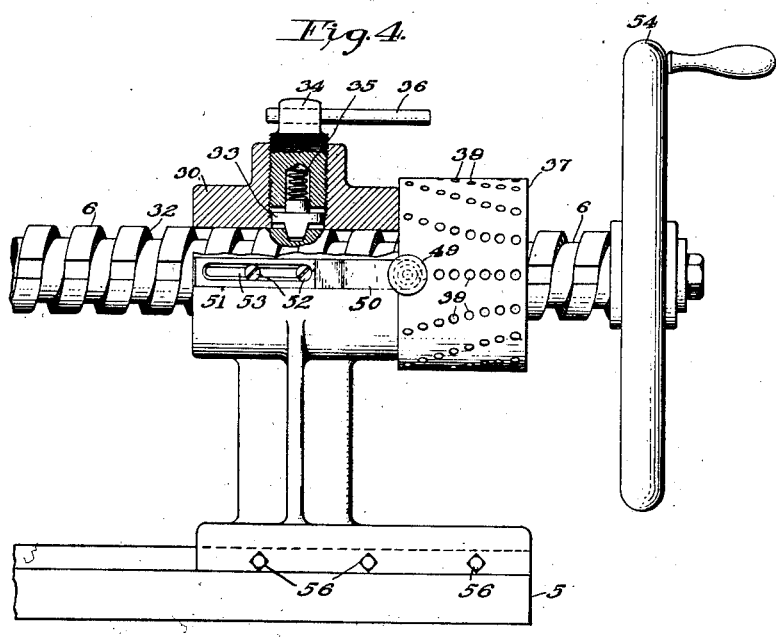
Inventor
Ole Severson
By Attorney
Albert F. Nathan March 13, 1928.

O. SEVERSON 1,662,078

METHOD OF AND MACHINE FOR GRINDING FINE TOOTH HOBS

Filed Jan. 12, 1925

5 Sheets-Sheet 4

Inventor
Ole Severson
By Attorney
Albert F. Nathan

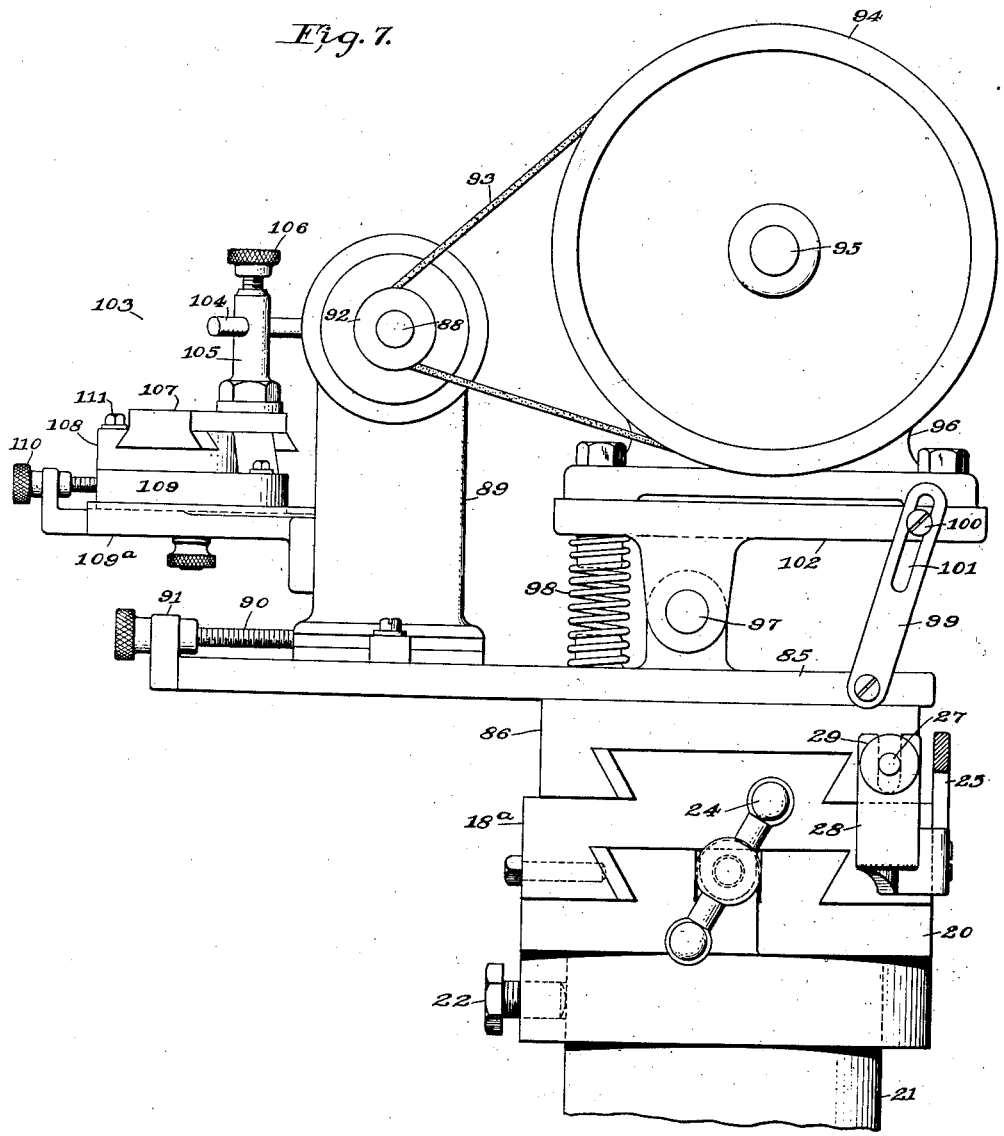

Patented Mar. 13, 1928.

1,662,078

UNITED STATES PATENT OFFICE.

OLE SEVERSON, OF SHELTON, CONNECTICUT, ASSIGNOR TO THE O. K. TOOL COMPANY, INC., OF NEW YORK, N. Y., A CORPORATION OF NEW YORK.

METHOD OF AND MACHINE FOR GRINDING FINE-TOOTH HOBS.

Application filed January 12, 1925. Serial No. 1,876.

My invention relates to methods of and machines for grinding the teeth on rotatable cutting tools and particularly to methods of and machines for shaping and relieving the teeth on hobs.

One object of my invention is to provide a method of and a machine for grinding hobs having teeth, which are adapted to cutting a predetermined form, such as for example, teeth on gear wheels, that shall provide for indexing the hob to various positions and hold it stationary in such positions during the relieving of the teeth and that shall provide for setting the grinding wheel in accordance with the side angle of the teeth and in accordance with the angle of relief required on the sides of the teeth.

Another object of my invention is to provide a machine for grinding a fine toothed hob that shall hold the hob against rotative movement during the relieving movements and that shall provide means for adjusting the grinding wheel in accordance with the side angle of the teeth and the angle of relief required on the sides of the teeth, whereby the front cutting faces may be ground without changing the form cut by them.

Another object of my invention is to provide a method of grinding teeth on a rotatable cutting tool and preferably on a hob that shall effect a relative rotation between a hob and a grinding wheel for bringing each side of each tooth into operative relation to a grinding wheel, which is set not only in accordance with the angle on the sides of the teeth but also in accordance with the angle of relief on the sides of the teeth, and that shall hold the hob against rotative movement while effecting relative relieving movements between the hob and the wheel.

A further object of my invention is to provide a machine for grinding teeth on a hob that shall be provided with improved means for positioning and indexing the hob in operative positions with respect to a grinding wheel, which is set not only in accordance with the angle on the sides of the hob teeth but also in accordance with the angle of relief desired on the sides of the teeth, and that shall effect relative relieving movements between the hob and the wheel while the hob is held against rotative movement.

In grinding many rotatable cutting tools and particularly in grinding hobs which are adapted to cut gear teeth, it is essential to grind and relieve the hob teeth so that they will cut the gear teeth to the desired form. In a grinding machine constructed in accordance with my invention the teeth of the hob are ground and relieved in an efficient manner. The teeth on the hob are so shaped as to cut teeth of the required form on a gear blank. In my grinding machine, the rotative positions of the hob for grinding the various teeth are preferably accurately set by means of an indexing mechanism which is carried by the arbor supporting the hob. The arbor, which supports the hob, is preferably provided with a thread having a lead similar to the lead of the hob being ground. Such arbor thread is engaged by a shoe member not only to effect longitudinal movement of the hob in accordance with the rotative movement thereof, but also for engaging the thread to lock the hob in any set position. The machine is adapted to grind teeth having either radial or undercut front cutting faces. However, my invention is preferably concerned in the grinding of detachable teeth which are provided with radial cutting faces. In a hob or cutting tool of the type under consideration a nibbling cut is always taken on a work piece and accordingly it is not of importance to provide the teeth with undercut cutting faces. A pencil grinding wheel is provided for grinding the sides of the hob teeth when the front cutting faces thereof are undercut. When grinding a right hand hob having undercut teeth it is necessary to relieve the right side of each tooth and when grinding a left-hand hob it is necessary to relieve the left side of each tooth. In relieving teeth having undercut cutting faces, it is necessary to preserve the side cutting edges which have been formed by the pencil grinding wheel.

When grinding teeth provided with radial cutting faces, it is unnecessary to shape the teeth by means of a pencil grinding wheel. The sides of the hob teeth may be shaped by means of a cup wheel which is positioned in accordance with the side angle of the teeth and the relief angle. In grinding a hob having teeth provided either with radial or undercut teeth, the outside or top of the teeth are ground to reduce the hob to the required diameter. Moreover, a form grinding wheel is rotated in engagement with the hob in rotation to simultaneously engage two sides of two teeth for roughly shaping the sides of the hob teeth. When the hob is provided with teeth having radial cutting faces, a grinding wheel, which is preferably a cup-shaped grinding wheel, is set not only in accordance with the side angle on the teeth but also in accordance with the angle of relief. Relative relieving movements are effected between the hob and the grinding wheel, which is set in accordance with the above mentioned two angles, for relieving one side of one tooth, the hob being held against rotative movement during the relieving operation. The hob is indexed to bring the remaining teeth into operative relation to the grinding wheel.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which:—

Figures 5, 6:
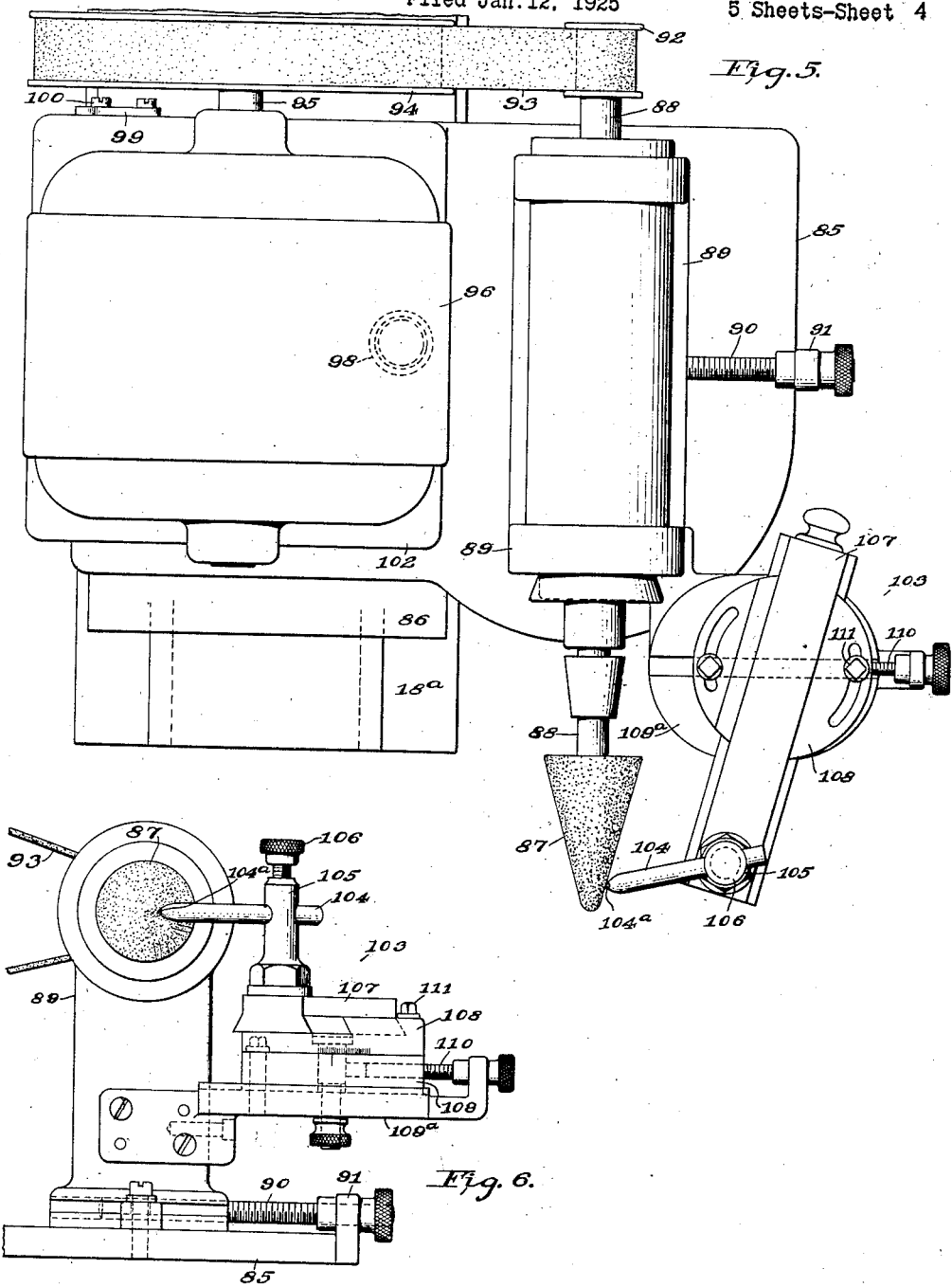

In the accompanying drawings, Fig. 1 is a side elevational view of a machine constructed in accordance with my invention and adapted to be operated in accordance with my method. Fig. 2 is a rear elevational view of the machine shown in Fig. 1. Fig. 3 is a view, partially in section, of the hob arbor and the indexing mechanism. Fig. 4 is a view, partially in section, of the mechanism for clamping the arbor in set positions. Fig. 5 is a plan view of the attachment for operating a pencil grinding wheel. Fig. 6 is an elevational view of a dressing attachment for the pencil grinding wheel. Fig. 7 is an elevational view of the pencil wheel attachment shown in Fig. 5.

Referring to the drawings, and particularly to Figs. 1 and 2, a grinding machine is illustrated comprising a base 1 upon which is supported a carriage 2. The carriage 2 is fitted to and movable along a post or guide member 3 which projects from the base 1. The carriage 2 supports a saddle 4 which in turn carries a slide 5. The slide 5 supports the hob carrying arbor 6.

A grinding wheel 7, which is mounted on the post 3 is positioned to engage a hob 8 which is mounted on the arbor 6. The grinding wheel 7 is mounted on a shaft 9 which is provided with bearings in a suitable bracket 10. A pulley 11 is mounted on the shaft 9 between the bearings on the bracket 10. The pulley 11 may be connected to any suitable source of power by means of a belt 12. The bracket 10 is provided with a circular base portion 13 which is mounted on an L-shaped supporting bracket 14. The base 13, which is secured to one arm 15 of the supporting bracket 14 by means of a bolt 16, is adjustable about the bolt 16 as a center. Preferably, graduations are formed on the base 13 to determine the angular setting of the axis of the grinding wheel in a vertical plane. The second arm 17 of the supporting bracket 14 is secured to a relieving slide 18 by means of a bolt 19. The bolt 19 serves as a center for adjusting the axis of the grinding wheel in a horizontal plane. Preferably, in setting the grinding wheel 7 to relieve teeth having radial cutting faces, the base 13 is adjusted on the arm 15 in accordance with the relief angle desired on the sides of the hob teeth and the support for the slide 18 is angularly adjusted in a horizontal plane in accordance to the side angle on the teeth.

The relieving slide 18 is mounted on a wheel slide 18$^a$ which in turn is mounted on a base member 20. The base member 20 is rotatably mounted on a cylindrical projection 21 from the post 3. A bolt 22 is provided for holding the base 20 in any set rotative position on the projection 21.

A screw shaft 23, which is mounted on the base 20, is operated by a hand wheel 24 for effecting movement of the wheel slide 18$^a$ on the base 20. The hand-wheel 24 is operated to adjust the grinding wheel 7 towards and away from the hob 8.

A lever 25, which is pivotally mounted on the wheel slide 18$^a$, is connected by an adjustable link 26 to the relieving slide 18, as shown in Fig. 1 of the drawings. The length of the link 26 is adjustable and the connection of the link to the lever 25 may be changed to adjust the position of the lever 25. A bolt 27, which is secured to the relieving slide 18, projects through a bracket 28. The bracket 28 is secured to the wheel slide 18$^a$. Two nuts 29, which are mounted on the bolt 27, engage the bracket 28 to limit the movement of the wheel 7 towards the hob 8 during the relieving operation. The relieving movements between the wheel 7 and the hob 8 are effected by operating the lever 25 and such movements, as above set forth, are limited by the nuts 29 on the bolt 27.

Referring to Figs. 1, 2, 3 and 4, the arbor 6, which carries the hob 8, is mounted on bearings 30 and 31. A thread 32 is formed on the arbor 6 with a lead corresponding to the lead on the threads of the hob to be ground. The thread 32 is formed on that part of the arbor which projects through the bearing 30 and cooperates with a shoe 33 to effect longitudinal movement of the hob in accordance with the rotative movement thereof. The shoe 33 is supported in the bearing 30, as shown in Fig. 4, and is fitted to the thread 32. The shoe 33 serves not only to cooperate with the threads 32 for effecting the longitudinal movement of the hob but also for clamping the arbor in a set position. The shoe 33 is forced into engagement with the bottom of the thread 32 by means of a locking bolt 34. The locking bolt 34 is threadably connected to the bearing 30 and is connected to the shoe 33 by means of a spring 35. An operating handle 36 is provided for operating the bolt 34.

An indexing head 37, which is splined to the arbor 6, is provided for setting the hob in various operative positions to grind the hob teeth. A bracket 38, which is secured to the bearing 30, engages the indexing head 37 to prevent any longitudinal movement of such head with respect to the bearing 30. A spring pressed plunger 49 which is mounted on an arm 50, is fitted to holes 39 which are formed in the periphery of the indexing head 37. The holes 39 are formed in the indexing head in accordance with the combination of positions desired to set the hob for grinding operations. The arm 50, which supports the plunger 49, is adjustable in a slot 51 formed in the bearing 30. Two set screws 52, which are secured to the bearing 30, project through a slot 53 in the arm for clamping the arm in any set position. A suitable hand wheel 54 is provided for rotating the hob and the arbor 6.

The bearing 30 is secured to the slide 5 by means of set screws 56. The bearing 31 is slidably mounted on the slide 5 and is moved in accordance with the operation of the hand-wheel 54. The end of the arbor 6 is secured to the bearing 31 by means of a bolt 57 and a washer 58. The slide 5 is mounted on a swiveling base 60$^a$. The swiveling base 60$^a$ is mounted on a slide 60 which is supported on a base 61$^a$. The base 61$^a$ is supported on the saddle 4. A screw shaft 61, which is mounted on the carriage 2, is connected to the saddle 4 by means of a nut 62. The screw shaft 61 serves to effect movement of the hob 8 towards and away from the grinding wheel 7. The screw shaft 61 is operated by a suitable hand lever 63.

The slide 60 is operated on the base 61$^a$ by means of a hand lever 64. The lever 64 is mounted on a shaft 65 which carries a spiral gear wheel 66. The gear-wheel 66 meshes with a gear-wheel 67 which is mounted on a shaft 68. The shaft 68, which is mounted in the base 61$^a$, carries a pinion 69 which meshes with the teeth of a rack 70. The rack 70 is secured to the slide 60. The shaft 68 carries a pinion 120 near the end thereof which meshes with a gear wheel 121. A hand lever 122 is provided for operating the gear-wheel 121. The hand-lever 122 serves to effect a rapid movement of the slide 60.

The carriage 2 is raised and lowered on the post 3 by means of a hand lever 72. The lever 72 is mounted on a shaft which carries a worm 73. The worm 73 meshes with a worm wheel 74 which is mounted on a shaft 75. The shaft 75 carries a pinion 76 which meshes with rack teeth 77 which are formed on the post 3.

In grinding a hob on my machine and in accordance with my method, a grinding wheel is preferably mounted on the wheel shaft 9 and rotated in engagement with the periphery of the teeth 78 on the hob. In such a manner the diameter of the hob is reduced to the required size. The teeth 78, which are shown on the hob 8, are preferably detachable in order to permit replacement when desired. After bringing the hob to the required diameter, a form grinding wheel is mounted on the wheel axis 9 for roughly shaping the teeth 78 to the required size. The form grinding wheel, which is used for roughing purposes, is preferably shaped to engage two sides of two hob teeth simultaneously. The hob is rotated by the hand wheel 54 in order to bring all teeth into engagement with the rotating form wheel.

When the teeth are provided with radial cutting faces, the attachment which is shown in Figs. 1, 2 and 3 of the drawings, is used for shaping and relieving the sides of the teeth. A wheel, which preferably is cup-shaped, is adjusted not only in accordance with the side angle of the teeth but also in accordance with the relief required on the sides of the teeth. The adjustment of the axis of the wheel in accordance with the angle of relief is preferably effected by rotating the base 13 with respect to the arm 15 about the bolt 16 as a center. The adjustment of the axis of the grinding wheel in accordance with the side angle of the teeth is preferably effected by adjusting the base 20 on the projection 21.

One hob tooth is positioned by means of the indexing mechanism to be engaged by the grinding wheel. The arbor 6 and the hob 8 are clamped in set position by means of the shoe 33 engaging the bottom of the arbor thread. The grinding wheel, which has been set as above set forth in accordance with the side angle of the teeth and in accordance with the relief required on the side of the teeth, is operated by the lever 25 to shape and relieve one side of one hob tooth. It may be noted that prior to the adjustment of the axis of the grinding wheel, the wheel axis and the hob axis are placed in the same plane and the cutting face of the tooth to be ground is positioned in such a plane.

Upon completing the relieving movements to shape the side of a hob tooth, the lever 36 is operated to release the hob arbor for permitting the indexing of the hob to bring a second tooth into operative position with respect to the grinding wheel. The above operation is repeated until all the teeth have been ground and relieved on one side. It should be noted that the wheel must be set again when the opposite side of the teeth are to be ground. The setting of the wheel for grinding the opposite side of the teeth is effected in a manner similar to the setting above described. Particular attention is called to the fact that the hob is held against rotative movement during the relieving of a tooth thereon. The relieving movements are not effected radially with respect to the hob but are effected at an angle with respect to the hob axis. The angle which the relieving movements make with the axis of the hob corresponds to the angle on the sides of the hob teeth. Such relief is not similar to radial relief or to axial relief which is now used in shaping hob teeth.

Referring to Figs. 5, 6 and 7, an attachment for operating a pencil grinding wheel is illustrated. The pencil grinding wheel is used when the teeth on the hob to be ground are provided with undercut cutting faces.

The pencil grinding wheel attachment comprises a plate 85 which is mounted on a slide 86. The slide 86 is mounted on the wheel slide 18a shown in Figs. 1 and 2 of the drawings. It will be noted that slide 86 replaces the relieving slide 18 shown in Figs. 1 and 2 of the drawings. A pencil grinding wheel 87 is mounted on a shaft 88. The shaft 88 is carried by a suitable wheel support 89. The wheel support 89 is adjustable on the plate 85 by means of a screw 90. The screw 90 is secured to a lug 91 projecting from the plate 85, as is shown in Figs. 5, 6 and 7 of the drawings. The shaft 88 carries a pulley 92 which is connected by a belt 93 to a pulley 94. The pulley 94 is mounted on an armature shaft 95 of a motor 96. The motor 96 is carried by a base 102 which is pivotally supported on the plate 85 by means of a shaft 97. A spring member 98 is located between the base 102 and the plate 85 for exerting a force tending to rotate the motor 96 away from the axis of the pencil wheel. Such force tends to maintain the belt 93 under tension. A link 99, which is pivotally connected to the plate 85, is connected to the base 102 by means of a bolt 100. The bolt 100 is secured to the base 102 and projects through a slot 101 in the lever 99. The link 99 serves to limit the rotative movement of motor 96 about the shaft 97.

A dressing attachment 103 is provided for truing the pencil wheel 87 in accordance with the side angle desired to be formed on the teeth of the hob. The dressing attachment comprises a diamond holder 104 which is adjustably secured in a supporting post 105 by means of a set screw 106. The holder 104 carries a diamond 104a for engaging the pencil wheel. The post 105 projects from a slide 107 which is mounted on a table 108. The table 108 is rotatably adjusted on a supporting base 109. The base 109 is slidably mounted on a base 109a and is operated by means of a screw 110. A suitable screw 111 is provided for clamping the table 108 in any set position on the base 109. It should be noted the table 108 is set in any desired position for determining the angle of movement of the slide 107 with respect to the axis of the pencil wheel.

In grinding a cutter having teeth provided with undercut cutting faces, the outside diameter of the hob is brought down to size and the teeth are roughly shaped in the same manner as when grinding teeth provided with radial cutting faces. When the teeth are roughly shaped the pencil grinding wheel shown in Figs. 5, 6, and 7 of the drawings is set perpendicular to the axis of the hob. The sides of the pencil grinding wheel are dressed in accordance with the angle of the sides of the teeth. When the pencil grinding wheel is so positioned and so dressed, the hob is rotated to bring one side of each tooth into engagement with the wheel. After completing the grinding of one side of each hob tooth the position of the pencil grinding wheel is reversed to dress the other side of the hob teeth. The pencil grinding wheel grinds the teeth of the hob to cut the exact form of the desired gear teeth. However, it is necessary to provide relief on one side of each hob tooth. In the case of a right-hand hob it is necessary to relieve the right side of each hob tooth and in the case of a left-hand hob it is necessary to relieve the left side of each hob tooth. In relieving one side of each of the hob teeth it is essential not to grind the front cutting edge which has been cut to the exact shape necessary to cut the gear teeth. In relieving the teeth having undercut cutting faces, the hob is held against rotative movement substantially as during the relieving of the teeth provided with radial cutting faces.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims:—

Having thus revealed this invention, I claim as new and desire to secure the following combinations and elements, or equivalents thereof, by Letters Patent of the United States:—

1. In a hob grinding machine, the combination comprising an arbor; a thread formed on said arbor having the same lead as the thread formed by the hob teeth to be ground; mechanism co-operating with said arbor thread for longitudinally moving the arbor in accordance with the rotation thereof and for holding the hob stationary during the grinding of the teeth; and indexing mechanism carried by said arbor for setting it in positions for grinding the various teeth in the hob thread.

2. In a hob grinding machine, the combination comprising a supporting arbor; a thread formed on said arbor having a lead corresponding to the lead of the hob to be ground; mechanism comprising a shoe engaging said thread for effecting longitudinal movement of the arbor in accordance with the rotary movement thereof, said shoe being forced into engagement with the bottom of the thread for locking the arbor in set positions during the grinding of the various teeth; and an indexing mechanism mounted on said arbor.

3. In a hob grinding machine, the combination comprising an arbor for supporting a hob having a plurality of teeth to be ground; a thread formed on the arbor of the same lead as the thread formed by the hob teeth for effecting longitudinal movement of the arbor in accordance with the rotative movement thereof; an indexing mechanism splined to said arbor and secured to an arbor bearing for setting the hob in positions to grind the teeth thereon and means for holding the hob in indexed position during a grinding operation.

4. In a hob grinding machine, the combination comprising an arbor for supporting a hob; a thread formed on the arbor of the same lead as the hob thread; mechanism on an arbor bearing for engaging the arbor thread not only to move the arbor longitudinally upon rotation thereof but also to lock the arbor in set positions for grinding the various teeth; and an indexing mechanism mounted on said arbor and secured to an arbor bearing.

5. In a hob grinding machine, the combination comprising an arbor for supporting a hob; a thread formed on the arbor of the same lead as the hob thread; adjustable bearings for supporting arbor; a slide for supporting said bearings; a shoe mounted on one of said bearings for engaging the arbor thread not only to move the arbor longitudinally upon rotative movement thereof but also to lock the arbor in set position; and an indexing mechanism splined to said arbor and held in position adjacent to one of said bearings for setting the hob in positions to grind the teeth thereon.

6. In a hob grinding machine, the combination comprising an arbor for supporting a hob; mechanism for effecting longitudinal movement of the arbor in accordance with lead of the hob thread and in accordance with the rotative movement thereof; an indexing mechanism mounted on said arbor for setting the hob in positions to grind the various teeth thereon; a grinding wheel for engaging the hob; and wheel supporting mechanism adapted to effect adjustment of the wheel axis about two axes which are located in perpendicular planes.

7. In a hob grinding machine, the combination comprising an arbor for supporting a hob; mechanism for effecting longitudinal movement of the arbor in accordance with the lead of the hob thread and in accordance with the rotative movement thereof; an indexing mechanism connected to said arbor for setting the hob in positions to grind the various teeth thereon; a grinding wheel for engaging the hob; a plurality of slides rotatably adjustable about an axis perpendicular to the plane of their movement; and mechanism for supporting the wheel on said slides to permit adjustment of the wheel axis about an axis in a plane perpendicular to the plane of movement of the slides.

8. In a hob grinding machine, the combination comprising an arbor for supporting the hob to be ground; a thread formed on said arbor having the same lead as the hob to be ground; a shoe engaging said thread for effecting movement of the arbor in accordance with the rotation thereof and for locking the arbor in set positions for grinding the various teeth; a grinding wheel; supporting mechanism for said wheel, said supporting mechanism serving to adjust the axis of the wheel in two planes located at right angles to each other; and slides for supporting said mechanism and operable to effect relieving movements.

9. In a hob grinding machine, the combination comprising an arbor for supporting a hob to the ground, said arbor having a thread formed thereon of the same lead as the hob thread for moving the arbor longitudinally in accordance with the rotative movement thereof; an indexing mechanism for setting the hob in positions to grind the teeth thereon; a grinding wheel for engaging the hob teeth and adjustable about two axes located in planes perpendicular to each other; and mechanism comprising slides for adjusting the wheel with respect to the hob and operable for effecting relieving movements.

10. In a hob grinding machine, the combination comprising an arbor for supporting a hob; a thread formed on said arbor having the same lead as the hob; a shoe member engaging said thread for effecting longitudinal movement of the arbor in accordance with the rotative movement thereof and for locking the arbor in set positions during the grinding of the various teeth; an indexing mechanism carried by said arbor for setting the hob in the various operative positions for grinding the teeth; a grinding wheel for engaging the hob carried by said arbor; means for supporting the grinding wheel to effect angular adjustment in one plane in accordance with relief angle on the hob and to effect angular adjustment in a second plane in accordance with angle on the sides of the hob teeth, said supporting means also being operable to effect relieving movements by the wheel.

11. In a hob grinding machine, the combination comprising an arbor for supporting a hob to be ground, said arbor having a thread formed thereon of the same lead as the hob thread; an indexing head mounted on said arbor for setting the hob in positions to grind the various teeth thereon; bearings for supporting said arbor; a shoe on one of said bearings for engaging the thread on said arbor to effect movement of the latter longitudinally in accordance with the rotation thereof; a grinding wheel for engaging the hob teeth; mechanism for rotatably adjusting the axis of the grinding wheel in a vertical plane; and slides for supporting said wheel, said slides being rotatively adjustable in a horizontal plane to set the wheel in operative position with respect to the hob and operable to effect relieving movements.

12. The method of grinding hobs, which consists in setting a wheel in accordance with one side angle of the teeth and in accordance with the angle of the relief required on one side of the teeth; in effecting relieving movements between the wheel and the hob while preventing rotative movement of the hob; and in indexing the hob to set it in positions to relieve other teeth on the hob.

13. The method of grinding hobs, which consists in setting a wheel and a hob with respect to each other in accordance with one side angle of the hob teeth and in accordance with the angle of relief required on one side of the teeth; in effecting relieving movements between the wheel and the hob while preventing rotative movement of the hob; in indexing the hob to relieve one side of the remaining teeth on the hob; in setting the wheel and the hob with respect to each other in accordance with the other side angle of the hob teeth and in accordance with the angle of relief on the other side of the teeth; in effecting relieving movements between the wheel and the hob to relieve the other side of a hob tooth; and in indexing the hob to set it in positions to relieve the other side of the remaining teeth on the hob.

14. The method of grinding hobs, which consists in rotating the hob and effecting longitudinal movement thereof while in engagement with a rotating form wheel to roughly cut two sides of the hob teeth to the required size; in setting a wheel in accordance with a side angle of the teeth and in accordance with the angle of relief required on one side of the teeth; in effecting relieving movements between the wheel and the hob while preventing rotation of the hob to relieve one side of one hob tooth; and in indexing the hob to relieve other teeth on the hob.

15. The method of grinding hobs, which consists in rotating the hob and effecting longitudinal movement thereof while in engagement with a rotating form wheel to roughly cut two sides of the hob teeth the required size; in setting a wheel in accordance with a side angle of the teeth and in accordance with the angle of relief required on one side of the teeth; in effecting relieving movements between the wheel and the hob while preventing rotation of the hob to relieve one side of a hob tooth; in indexing the hob to relieve other teeth on the hob; in setting the wheel in accordance with the angle on the opposite side of the teeth and in accordance with the angle of relief required on the other side of the teeth; in effecting relieving movements between the wheel and the hob while preventing rotation of the hob to relieve the other side of a hob tooth; and in indexing the hob to relieve the other side of the remaining teeth on the hob.

16. The method of grinding hobs, which consists in setting the axis of a grinding wheel in one plane according to the relief required on the sides of the hob teeth; in setting the axis of the grinding wheel in a second plane according to the relief angle required on one side of the hob teeth; in effecting relieving movements by the wheel while preventing rotative movement of the hob; in indexing the hob being ground to set other teeth in operative positions to grind one side of other hob-teeth; and in resetting the wheel to grind the opposite side of the hob teeth.

17. The method of grinding hobs, which consists in rotating a hob and effecting longitudinal movement thereof while in engagement with a rotating form wheel to roughly cut two sides of the hob teeth to the required size; in setting a cup wheel in accordance with the side angle of the hob teeth and in accordance with the angle of relief required on one side of the teeth; and in effecting relieving movements between the hob and the wheel to shape the teeth to cut a predetermined form.

18. The method of grinding hobs, which consists in grinding the tops of the teeth to reduce the hob to the required diameter; in rotating the hob and effecting longitudinal movement thereof while in engagement with a rotating form wheel to roughly cut two sides of the hob teeth to the required size; in setting a wheel in accordance with the angle on one side of the teeth and the relief angle required on one side of the teeth; in effecting relieving movements between the hob and the wheel to shape the teeth on one side of the hob teeth; in setting the cup wheel in accordance with the angle on the other side of the hob teeth and the relief angle required on the other side of the teeth; and in effecting relieving movements between the hob and the wheel to shape the teeth on the other side of the hob teeth.

19. The method of grinding hobs, which consists in setting the axis of a grinding wheel in a vertical plane according to the relief required on the sides of the hob teeth; in setting the axis of the wheel in a horizontal plane according to the angle required on the sides of the hob teeth; in effecting relieving movements by the wheel while preventing rotative movement by the hob; and indexing the hob while effecting longitudinal movement thereof to bring the next succeeding tooth into operative position with respect to the wheel.

20. The method of grinding hobs, which consists in grinding the tops of the teeth to reduce the hob to the required diameter; in rotating the hob and effecting longitudinal movement thereof while in engagement with a rotating form wheel to roughly cut two sides of the hob teeth to the required size; in setting the axis of a wheel in one plane according to the angle required on the sides of the teeth; in setting the axis of the wheel in another plane according to the relief required on the sides of the hob teeth; in effecting relieving movements by the wheel while in engagement with one side of a hob tooth; and indexing the hob being ground while effecting a longitudinal movement thereof to bring the next succeeding tool into operative position with respect to the wheel.

In witness whereof, I have hereunto subscribed my name.

OLE SEVERSON.